May 13, 1958 C. L. GRAYBILL 2,834,229
REVERSING MECHANISM
Filed Sept. 23, 1954 4 Sheets-Sheet 1
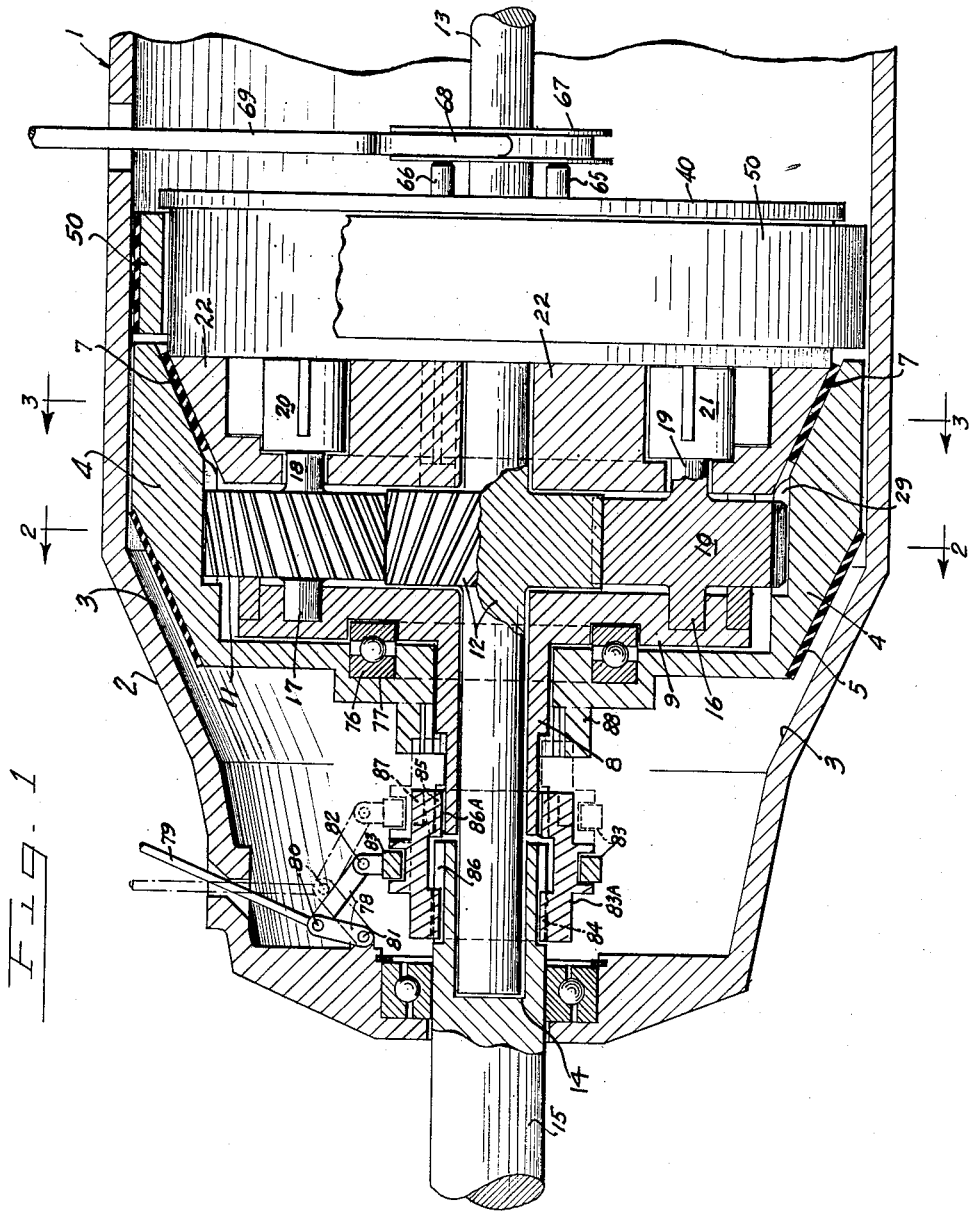
CLINTON L. GRAYBILL
INVENTOR
BY
*James L. Ginnan*
ATTORNEY May 13, 1958 C. L. GRAYBILL 2,834,229
REVERSING MECHANISM
Filed Sept. 23, 1954 4 Sheets-Sheet 2
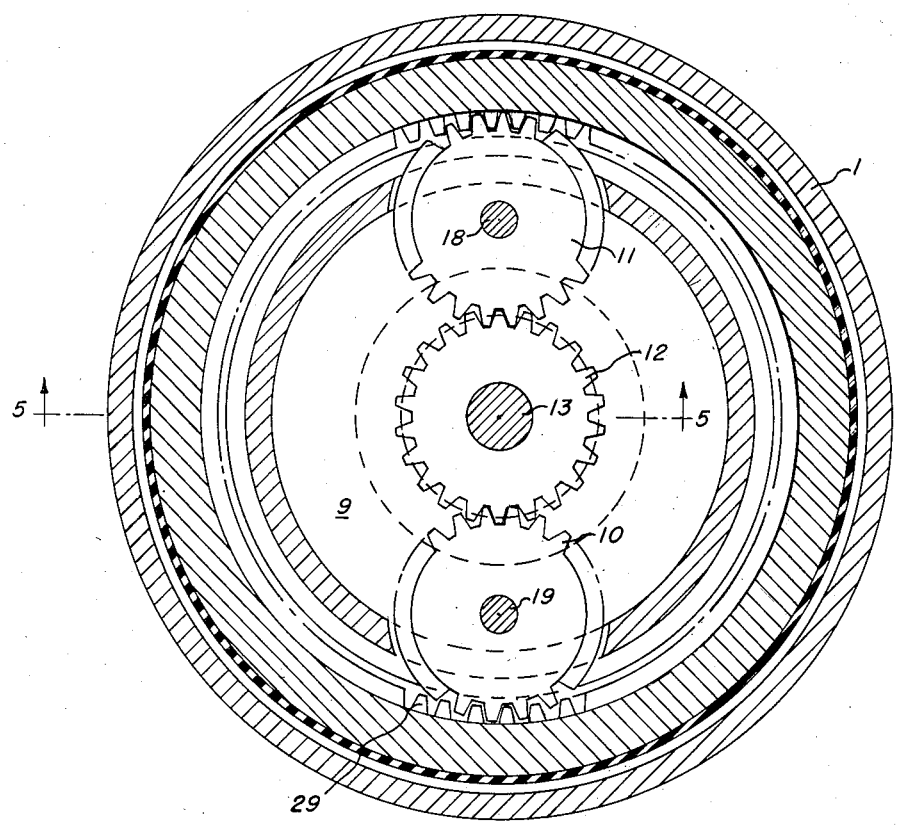
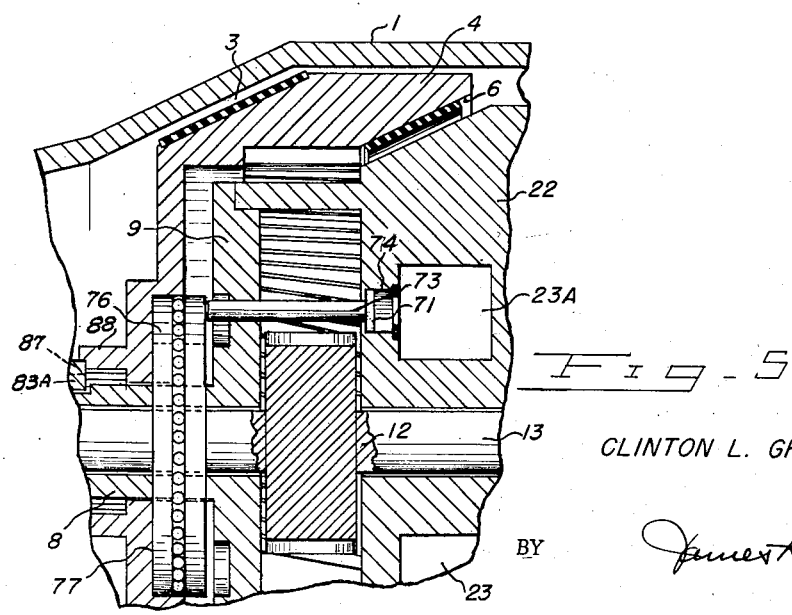
INVENTOR
CLINTON L. GRAYBILL
BY
ATTORNEY May 13, 1958
C. L. GRAYBILL
2,834,229
REVERSING MECHANISM
Filed Sept. 23, 1954
4 Sheets-Sheet 3
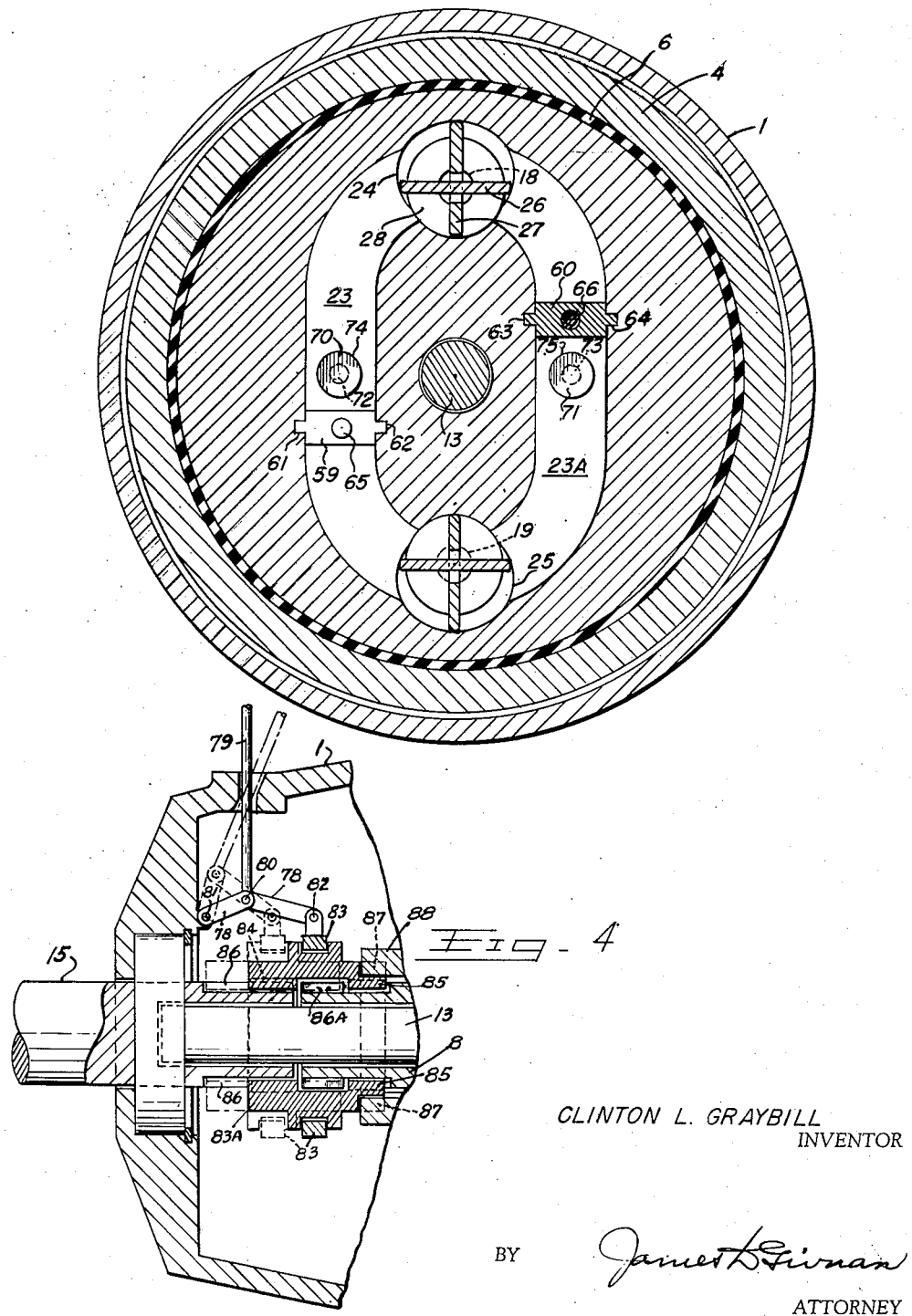
CLINTON L. GRAYBILL
INVENTOR
BY
ATTORNEY May 13, 1958 C. L. GRAYBILL 2,834,229
REVERSING MECHANISM
Filed Sept. 23, 1954 4 Sheets-Sheet 4

INVENTOR
CLINTON L. GRAYBILL

BY
ATTORNEY

United States Patent Office 2,834,229
Patented May 13, 1958

2,834,229

REVERSING MECHANISM

Clinton L. Graybill, Superior, Mont.

Application September 23, 1954, Serial No. 457,882

1 Claim. (Cl. 74—765)

This invention relates to improvements in reversing mechanisms between a driven shaft and a driving shaft.

One of the principal objectives of the invention is to provide a mechanism of this character which will automatically go into reverse drive following the setting of manually control means, and also the provision of means to automatically apply the load to the compression of the engine instead of manually "downshifting" as heretofore.

These and other objects will appear as my invention is more fully hereafter described in the following specification illustrated in the accompanying drawing and finally pointed out in the appended claim.

In the drawings:

Fig. 1 is a longitudinal sectional view of a reversing mechanism made in accordance with my invention.

Fig. 2 is a sectional end view taken approximately along the line 2—2 of Fig. 1.

Fig. 3 is a similar view taken approximately along the line 3—3 of Fig. 1.

Fig. 4 is a sectional detail view of a shifting mechanism.

Fig. 5 is a fragmentary sectional view taken approximately along line 5—5 of Fig. 2.

Figure 6:
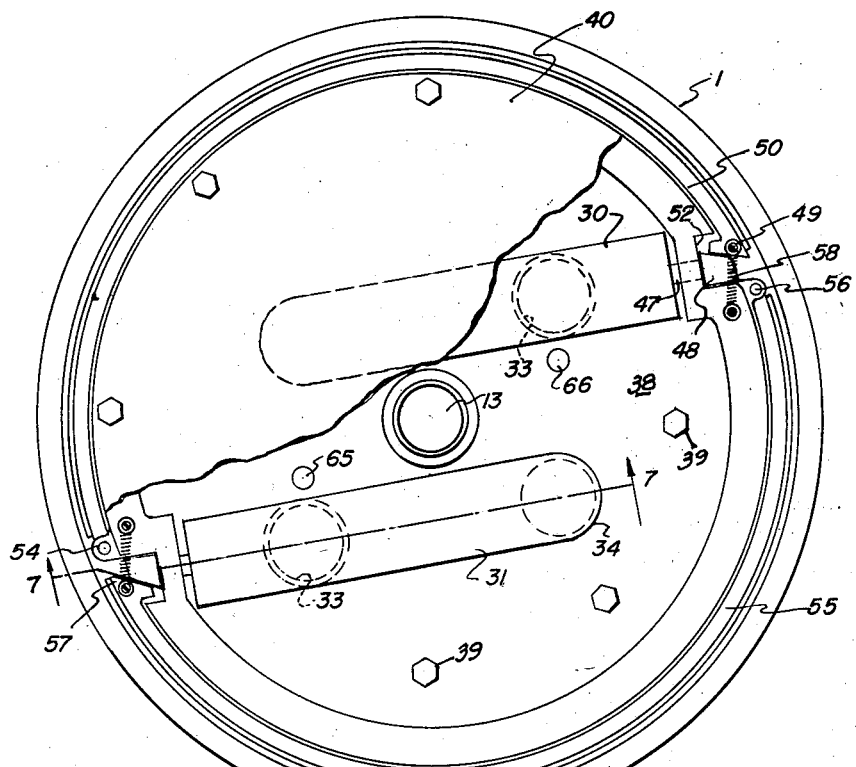
Fig. 6 is an end view of Fig. 1 with a fragment broken away.

Referring now more particularly to the drawings:

With particular reference to Fig. 1, reference numeral 1 indicates a fixedly mounted cylindrical casing tapered for a portion of its length as at 2 toward one of its ends to form an internal surface to provide a clutch plate 3 for cooperation with an engaging member 4 suitably lined as at 5 with any suitable material. The opposite side of the member 4 is formed into an internal clutch surface, also provided with suitable lining indicated at 7. The engaging member 4 is rotatably mounted upon a hollow hub 8 of one wall 9 of a housing 22, provided with 2 planet spiral gears 10 and 11 meshing with and driven by a spiral sun gear 12 secured to or formed integral with a driving shaft 13 whose one end portion extends through the hollow hub 8 and into a bore 14 extending into one end of a driven shaft 15 connected to a load. The opposite end of the driving shaft 13 may be connected to an engine or any other prime mover through suitable gear transmission means not shown. The shaft would, of course, extend through a suitable bearing carried by the corresponding end of the casing 1. The shafts 16 and 17 on one side of the planet gears 10 and 11, respectively, are rotatably mounted in the wall 9 of housing 22, as shown, and the shafts 18 and 19, respectively, on the opposite sides of the planet gears are journaled in bearings 20 and 21, respectively, in the housing 22 (see also Figs. 3 and 5) in which are formed two ducts 23 ad 23A whose ends are in open communication with recesses generally indicated at 24 and 25 to provide housings for identical rotary vane pumps, each including two intersecting vanes 26 and 27 slidably engaged with each other for oscillating motion at right angles with respect to each other. Each pair of vanes is slidably carried by a rotor 28 eccentrically mounted within its respective housing and connected to and driven by the shafts 18 and 19 of the planet gears 11 and 10. The planet gears are also enmeshed with spiral gear teeth 29 formed on the interior of the engaging member 4.

Figure 7:
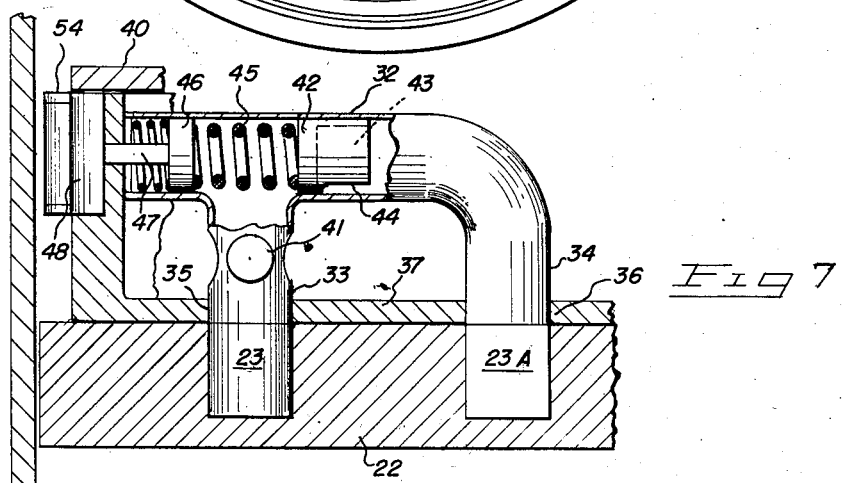
Fig. 7 is a sectional view taken approximately along the line 7—7 of Fig. 6.

As best illustrated in Figs. 6 and 7 the pump-communicating ducts 23 and 23A are bridged by by-passes indicated at 30 and 31. Each by-pass comprises a horizontal tubular portion 32 in open communication with tubular leg portions 33 and 34 whose bottom ends are secured by a forced fit or by any other suitable means in openings 35 and 36, respectively, formed in the bottom wall 37 of a reservoir generally indicated at 38 secured by bolts 39, or the like, to the end of the housing 22 and provided with a removable cover plate 40. The by-passes 30 and 31 are in communication at all times with the pump-communicating ducts 23 and 23A and with the interior of the fluid reservoir by means of openings 41 formed in the tubular leg 33 of each by-pass.

Slidably mounted within the horizontal tubular portion 32 of each by-pass is a piston 42 formed with a hollow tubular extension 43 formed with an elongated opening 44 throughout the length of its bottom portion so that fluid under certain conditions will flow from the duct (see Fig. 7) 23A down through the leg 33 and into the companion duct 23 when the piston is moved to the left by the pressure of the fluid against the resistance of compression spring 45 whose one end bears against the piston 42 and whose opposite end bears against a spring loaded plunger 46 provided with a stem 47 whose outer end terminates in a wedge 48 working against the tapered and free end 49 of a brake shoe 50 and a flat wall 51 of a recess 52 formed in the periphereal wall 53 of the reservoir to which the cover plate 40 is secured, as aforesaid, to seal the reservoir. The opposite end of the brake shoe 50 is swingably attached as at 54 to the wall of the reservoir at a point diametrically opposite from its free end 49 as is the companion brake shoe 55 swingably attached as at 56 to the wall of the reservoir, also at a point diametrically opposite to its free end 57. Inasmuch as both brake shoes and their actuating means are identical, a description of one and its operation will suffice for both. For normally maintaining the brake shoes in their inoperative positions, shown in Fig. 6, I interconnect their free ends with the wall of the reservoir by a tension spring 58.

From the foregoing it will be seen that when fluid pressure forces the piston 42 to the left, as viewed in Fig. 7, pressure against the spring 45 will force the plunger 46 and stem 47 outwardly to force its respective brake shoe outwardly into braking engagement with the housing 1 to positively lock the housing 22 and its related parts against rotation with respect to the housing 1.

Disposed within each of the pump-communicating ducts 23—23A for blocking off the flow of fluid therethrough under certain conditions, is a gate valve 59 and 60, respectively, slidably mounted in opposed grooves 61—62 and 63—64, respectively, formed in the sidewalls of the ducts. Each valve is operable by its stem 65 and 66 extending entirely through the reservoir and outwardly from the cover plate 40. Both valves are operable simultaneously through an externally grooved disc, or the like, indicated at 67 slidably mounted upon the shaft 13 for movement in two directions by means of any approved type of yoke 68 and handle 69 extending out through the housing 1 and terminating within convenient reach of the operator and connected in any suitable manner to a companion rod or lever 79 hereinafter referred to.

The pressure built up by blocking the flow of fluid through the ducts 23—23A from one of the pumps to the other by means of gate valves 59 and 60 which are moved to a closed position by the lever-actuated disc 67, will, of course, force plungers 70 and 71 and their stems 72 and 73, respectively, to the left as viewed in Figure 5 to a limit stop established by the depth of the recesses 74 and 75, respectively, within which the plungers operate.

The outer ends of the stems 72 and 73 bear against a thrust bearing 76 secured within an annular recess 77 in the rear face of the engaging member 4 and movable therewith from the engaged position shown in Figure 1 into the position shown in Figure 5 wherein the engaging member is entirely disengaged and simultaneously therewith the pressure of the fluid will force the brake shoes 50 and 55 against the walls of the fixed casing 1 to thereby lock the housing 22 against rotation, causing the engaging member 4 to reverse its rotation through the medium of the sun gear and planet gears. For transmitting the reverse rotation of the engaging member to the driven shaft 15, I provide a pair of toggle links 78 pivotally interconnected to each other and to an actuating rod 79 as at 80 and pivotally connected at the outer end as at 81 and 82 to the rear wall of the casing 1 and to the shifting ring 83 surrounding a collar 83A formed on its interior with longitudinally spaced apart splines 84 and 85 meshing with and slidable along splines 86 formed on the shaft 15 and on the hollow hub 8 of the housing 22 as at 86A. External splines 87 are formed at the forward end of the collar for cooperative engagement with an internally splined annulus 88 secured to or cast integral with the rear face of the engaging member 4. The rod 79 is connected, as aforesaid, to the lever 69 so that operation of one will simultaneously and effectively actuate the other.

It will be noted in Figure 1 that the planetary gears 10—11 and the gun gear 12 with which they are enmeshed at all times are of the spiral type and also that the internal gear teeth 29 in the engaging member 4 are angularly arranged for cooperative engagement with the angular teeth of the planetary gears 10 and 11 and, therefore, function as cam elements to move the engaging member 4 either to the right or to the left, as viewed in Figure 1, in accordance with the direction of loads applied to the gears. for example, assuming that the driving shaft 13 is rotating in a clockwise direction and the planet gears 10 and 11 are rotating in a counterclockwise direction, then the cam-acting teeth 29 will force the engaging member 4 into engagement with the housing 22 whereby the driving and driven shafts 13 and 15 respectively will be connected in direct drive because the planet gears become inoperative with respect to each other and rotate with the housing 22.

With the collar 83A in the full line position shown in Figure 1 and in the broken line position shown in Figure 4, the housing 22 by means of its hub 8 is connected to the driven shaft 15.

With the collar 83A in the full line position shown in Figure 4, the driven shaft 15 is connected to the engaging member 4 through the medium of its internally splined annulus 88 engaging with the external splines 87 on the corresponding end of the collar 83A. In this position, it will be noted that the splines 86A on the end of the hub 8 are disengaged from the internal splines of the collar 83A.

Upon deceleration of the engine the resultant reverse torque of the shaft 15, through its connection to the hub 8 and housing 22, will apply reverse loads to the planetary gears in an opposite direction with a resultant reverse action of the cam-acting teeth 29 on the interior of the engaging member 4 to force it in an opposite direction, or to the left as viewed in Figure 1, to thereby cause the engaging member to firmly engage with the surface 3 on the interior of the main casing 1 and thereby increase through the sun gear 12 the R. P. M. of the driving shaft 13 now working against engine compression.

What I claim is:

A reversing mechanism of the character described comprising in combination a driving shaft and a driven shaft, both extending into a fixedly mounted casing, said driving shaft being rotatably mounted within a circular housing disposed within the casing, a plurality of rotary pumps disposed within said housing and in communication with each other by interconnecting ducts, said pumps having shafts extending into a gear casing formed in said circular housing and connected to a plurality of spiral planetary gears meshing with a spiral sun gear carried by said driving shaft, said driving shaft extending from said sun gear through one wall of said housing and into a longitudinal bore formed in said driven shaft whereby rotation of the driving shaft will impart rotation to said pumps, an engaging member slidably mounted on and rotatable relative to one end of said housing and operatively connected by internal spirally arranged teeth to said planetary gears, manually actuated means for engaging said driven shaft with and disengaging it from said housing, means formed on said engaging member for selective engagement with said first mentioned means for interconnecting said engaging member with said driven shaft, said engaging member having an external surface engageable with said fixed casing and an internal surface engageable with said circular housing whereby movement of the engaging member in one direction will engage it with said fixed casing to stop rotation of the engaging member and whereby movement of the engaging member in an opposite direction will engage it with said circular housing to lock them together as a unit whereupon said driving and driven shafts will be connected in direct drive, manually actuated valve means disposed within said ducts for selectively blocking off the flow of fluid from one of said pumps to the other, fluid pressure actuated means in communication with said ducts and actuated by said fluid pressure therein to lock said circular housing to said casing and to hold the engaging member in a disengaged neutral position.

References Cited in the file of this patent

UNITED STATES PATENTS

| 1,077,371 | Selden | Nov. 4, 1913 |
| 1,588,602 | Midgley | June 15, 1926 |
| 2,471,031 | Gleasman | May 24, 1949 |
| 2,523,944 | Clary | Sept. 26, 1950 |